(12) United States Patent
Ahn et al.

(10) Patent No.: US 8,282,009 B2
(45) Date of Patent: Oct. 9, 2012

(54) MOBILE DEVICE AND POWER MANAGEMENT METHOD

(75) Inventors: Kyung-Mo Ahn, Yongin-si (KR); Chan-Yong Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 235 days.

(21) Appl. No.: 12/045,141

(22) Filed: Mar. 10, 2008

(65) Prior Publication Data

US 2008/0237355 A1   Oct. 2, 2008

(30) Foreign Application Priority Data

Mar. 27, 2007   (KR) .................. 10-2007-0029940

(51) Int. Cl.
*G06K 19/00* (2006.01)
(52) U.S. Cl. ...................... 235/492; 235/487
(58) Field of Classification Search .............. 235/439, 235/492; 455/41.1, 41.2, 572, 573, 558; 307/11, 31; 320/135–136
See application file for complete search history.

(56) References Cited

U.S. PATENT DOCUMENTS

| | | | |
|---|---|---|---|
| 5,138,142 A * | 8/1992 | Sanemitsu | 235/492 |
| 5,196,728 A * | 3/1993 | Jaux | 307/10.1 |
| 7,775,442 B2 * | 8/2010 | Saarisalo | 235/487 |
| 2003/0141989 A1 * | 7/2003 | Arisawa et al. | 340/870.01 |
| 2004/0204183 A1 * | 10/2004 | Lencevicius et al. | 455/574 |
| 2005/0224587 A1 * | 10/2005 | Shin et al. | 235/492 |
| 2006/0117192 A1 * | 6/2006 | Nokkonen | 713/300 |
| 2006/0121955 A1 * | 6/2006 | Shlomot | 455/574 |
| 2008/0121687 A1 * | 5/2008 | Buhot | 235/375 |
| 2009/0150704 A1 * | 6/2009 | Van Bosch | 713/340 |
| 2009/0291634 A1 * | 11/2009 | Saarisalo | 455/41.1 |

FOREIGN PATENT DOCUMENTS

| | | |
|---|---|---|
| KR | 1020030007304 A | 1/2003 |
| KR | 1020050053557 A | 6/2005 |
| KR | 1020060075128 A | 7/2006 |
| KR | 100621807 B1 | 9/2006 |

* cited by examiner

*Primary Examiner* — Michael G Lee
*Assistant Examiner* — Matthew Mikels
(74) *Attorney, Agent, or Firm* — Volentine & Whitt, PLLC

(57) ABSTRACT

A mobile device and related power management method are disclosed. The power management method includes detecting a level of residual battery power, and selectively enabling the provision of power to the smart card and the RF chip in accordance with the detected level of residual battery power.

14 Claims, 3 Drawing Sheets

MOBILE DEVICE AND POWER MANAGEMENT METHOD

CROSS-REFERENCE TO RELATED APPLICATIONS

This U.S. non-provisional patent application claims priority under 35 U.S.C. §119 to Korean Patent Application No. 10-2007-0029940, filed on Mar. 27, 2007, the subject matter of which is hereby incorporated by reference.

BACKGROUND OF THE INVENTION

The present invention relates to a mobile electronic device and power management method. More particularly, the invention relates to mobile electronic devices incorporating smart card functionality and related power management methods.

Mobile payment technology has advanced from smart card platforms for user payment information to mobile device platforms. That is, user information and related payment software that was once stored by a smart card is now integrally incorporated into mobile electronic devices, such as mobile phones, personal digital assistants (PDAs), MP3 players, motion picture players, a portable game consoles, etc. A user may now pay for goods and services (e.g., subway/bus fares, vending machines, sales kiosks, etc.) by placing his/her mobile device incorporating smart card functionality in close proximity to a corresponding terminal device (hereafter, "terminal").

By so doing, a reader within the terminal exchanges data signals with circuitry (e.g., a radio frequency identification (RFID) tag) in the mobile device facilitating the desired transaction. Such contactless communication of data signals between the smart card circuitry in the mobile device and the terminal is generally referred to as near field communication (NFC). Smart card enabled mobile devices may also be used to obtain physical access or information.

However, the contactless communication properties (e.g., RF characteristics, data transmission error rates, communication range, etc.) of a smart card (or smart card circuitry) mounted in a mobile device may change due to a number of causes. For example, impedance mismatching between the smart card circuitry and other mobile device components may occur. Additionally, some operating conditions or mode of the mobile device may actually interfere with the data being exchanged via contactless smart card functionality (e.g., operation of an RF module in a mobile phone, current flowing inside an MP3 player, etc.).

To minimize the potentially negative influences of these conditions and circumstances, a great deal of recent research has been directed to separating the integrated circuit (IC) facilitating analog wireless communication with the terminal RFID reader from the IC implementing the smart card functionality, and then effectively mounting both ICs within the mobile device.

SUMMARY OF THE INVENTION

Embodiments of the invention provide a mobile device and related power management method capable of effectively supplying power to a radio frequency communication IC and a smart card IC.

In one embodiment, the invention provides a mobile device, comprising; a battery, a radio frequency communication chip (RF chip) performing wireless communication with an external terminal, a smart card connected to the RF chip and communicating data with the terminal, and a controller selectively supplying power from the battery to the RF chip and the smart card in relation to a detected level of residual battery power.

In another embodiment, the invention provides a power management method of a mobile device comprising an RF chip and a smart card, the method comprising; detecting a level of residual battery power, and selectively enabling the provision of power to the smart card and the RF chip in accordance with the detected level of residual battery power.

In another embodiment, the invention provides a power management method of a mobile device including an RF chip and a smart card, the method comprising; detecting a level of residual battery power, cutting off power supplied to the RF chip when the detected level of residual battery power falls below a first level threshold, and cutting off power supplied to the smart card when the detected level of residual battery power falls below a second level threshold lower than the first level threshold.

DESCRIPTION OF EMBODIMENTS

Embodiments of the invention will now be described in some additional details with reference to the accompanying drawings. The present invention may, however, be embodied in different forms and should not be construed as being limited to only the illustrated embodiments. Rather, these embodiments are provided as teaching examples.

Figure 1:
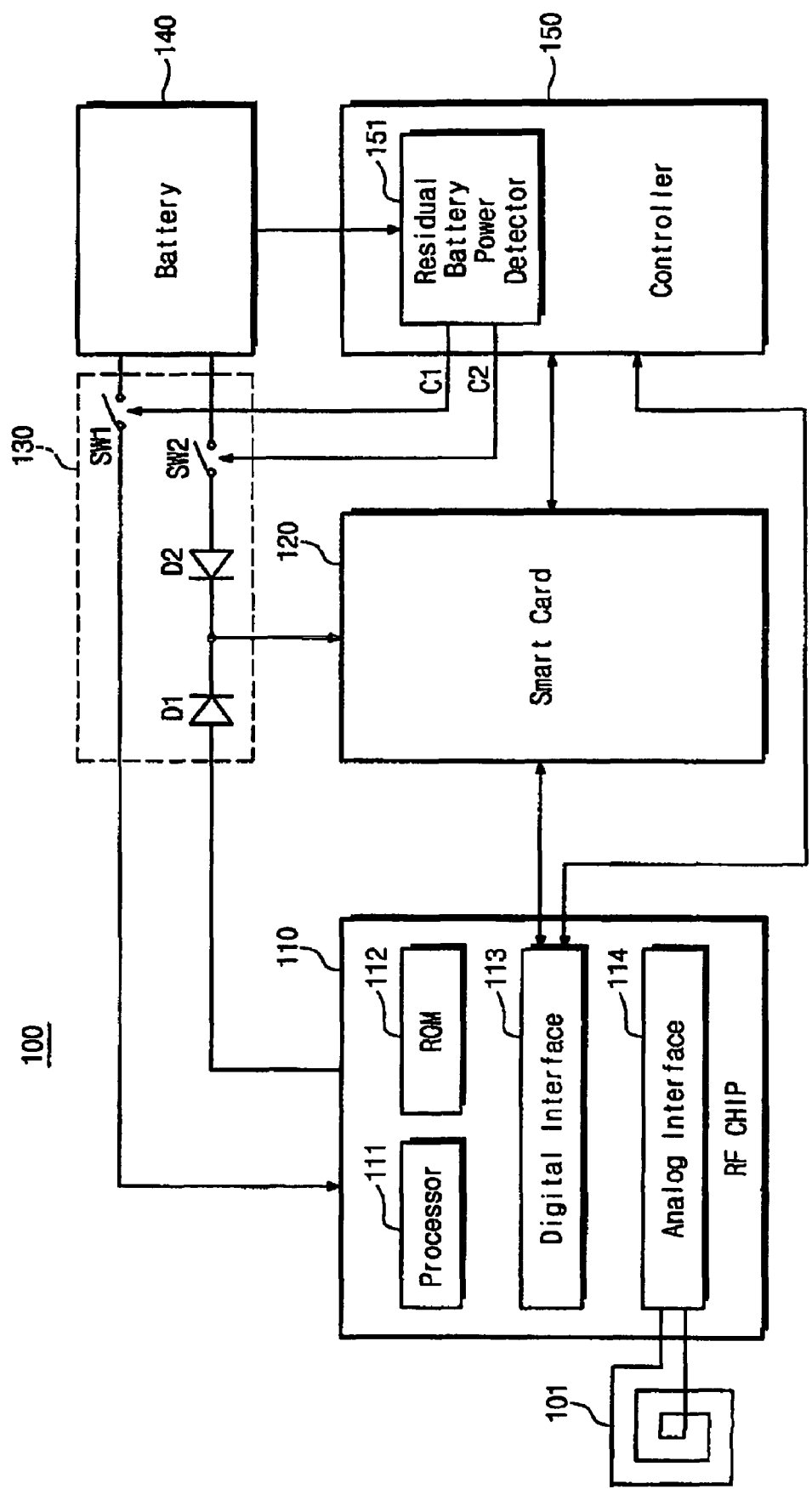
FIG. 1 is a block diagram of a mobile device according to an embodiment of the invention.

FIG. (FIG.) 1 is a block diagram of a mobile device 100 according to an embodiment of the invention. Referring to FIG. 1, mobile device 100 comprises a radio frequency (RF) communication IC (or "chip) 110 (hereinafter, referred to as "RF chip 110"), a smart card 120, a switching circuit 130, a battery 140 and a controller 150. Smart card 120 may be variously embodied within mobile device 100, for example as a discrete smart card of portable token incorporated within the mobile device or as distributed circuitry and related software implementing smart card functionality.

Although not shown in FIG. 1, mobile device 100 may further comprise a radio transceiver, a memory, a user keypad and display, a speaker, a microphone, etc.

RF chip 110 is configured to receive/transmit an RF signal from/to an external RFID reader (not shown but assumed to be located in a proximate terminal) through an antenna 101. In the illustrated embodiment, RF chip 110 comprises a processor 111, a read only memory (ROM) 112, a digital interface 113 and an analog interface 114.

Processor 111 controls the overall operation of RF chip 110 according to program code stored in ROM 112.

Analog interface 114 is configured to facilitate the wireless exchange of data signals with the external RFID reader through antenna 101. In one embodiment, analog interface 114 communicates with the external RFID reader using conventional near field communication (NFC) techniques in an RF band of about 13.56 MHz. Other embodiments of the invention will operate at other defined or designated RF frequencies or frequency bands (e.g., 125 KHz, 134 KHz, 433.92 MHz, 860-960 MHz, 2.45 GHz, etc.), and in accordance with one or more defined protocols.

Digital interface 113 communicates digital data derived from the RF signal(s) received by analog interface 114 with smart card 120. In one embodiment of the invention, digital interface 113 may communicate with smart card 120 using a conventional single wire protocol (SWP), such as those proposed by Axalto and Inside Contactless. As is understood by those skilled in the art, a SWP allows communication of data via a single electrical contact point.

Thus, RF chip 110 transmits a data supplied by smart card 120 or controller 150 to the RFID reader using a NFC technique, and transmits a data from the RFID reader through antenna 101 to smart card 120 or controller 150 using a SWP technique.

Smart card 120 may be implemented as a conventional contactless smart card chip, but without the typically associated RF functionality. Smart card 120 stores data identifying or authenticating the user or device terminal, including encryption code or keys. Smart card 120 is configured to communicate with RF chip 110 and controller 150.

Battery 140 supplies the power required for operation of mobile device 100. In this embodiment, battery 140 supplies power to RF chip 110 and smart card 120 via separate power voltage paths configured by switching circuit 130.

Controller 150 controls the overall operation of mobile device 100, and comprises a residual battery power detector 151. In the illustrated embodiment, residual battery power detector 151 provides switching control signals C1 and C2 in relation to a level of detected residual power for battery 140.

Switching circuit 130 selectively supplies power from battery 140 to each of RF chip 110 and smart card 120 in response to the switching control signals C1 and C2. In the illustrated embodiment, switching circuit 130 includes diodes D1 and D2 and switches SW1 and SW2. The anode of diode D1 is connected to RF chip 110 and its cathode is connected to smart card 120. Whereas the anode of diode D2 is connected to switch SW2 and its cathode is connected to smart card 120. Switch SW1 controls the application of power from battery 140 to RF chip 110 in response to the switching control signal C1. Switch SW2 controls the application of power from battery 140 to smart card 120 in response to the switching control signal C2.

Residual battery power detector 151 in controller 150 may detect the level of residual power associated with battery 140 in relation to one or more voltage/current signals provided by battery 140 (i.e., a reference power signal).

Figure 2:
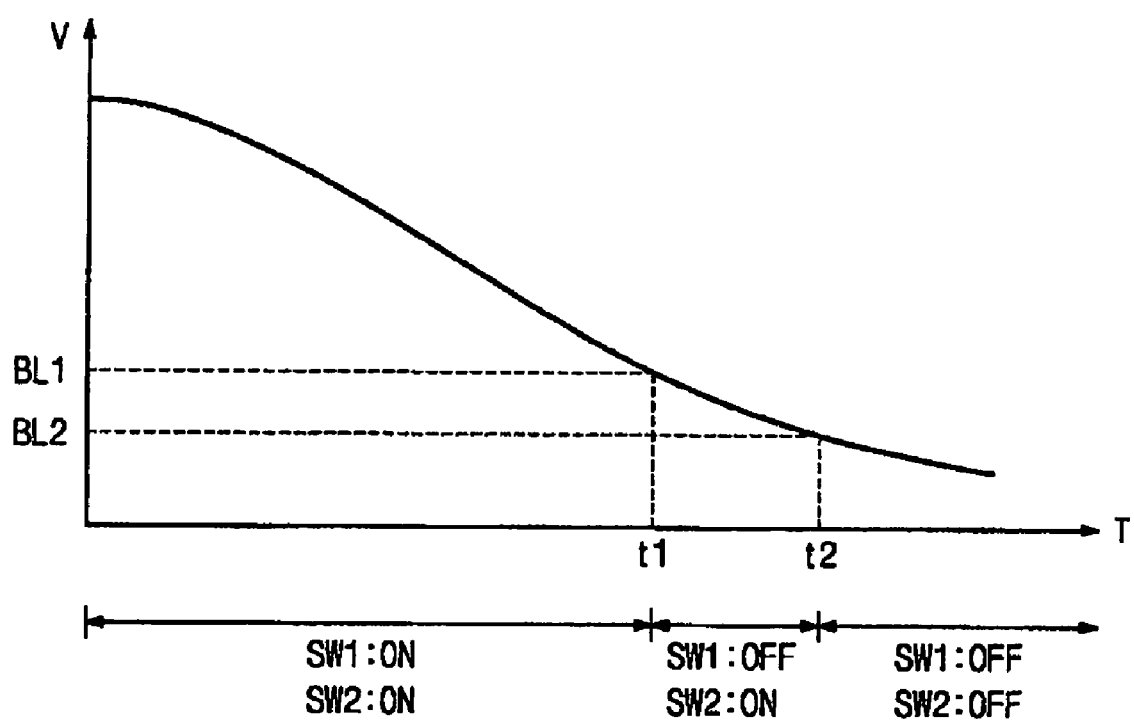
FIG. 2 is a graph illustrating ON/OFF states for switches SW1/SW2 in FIG. 1 as a function of residual battery power.
Figure 3:
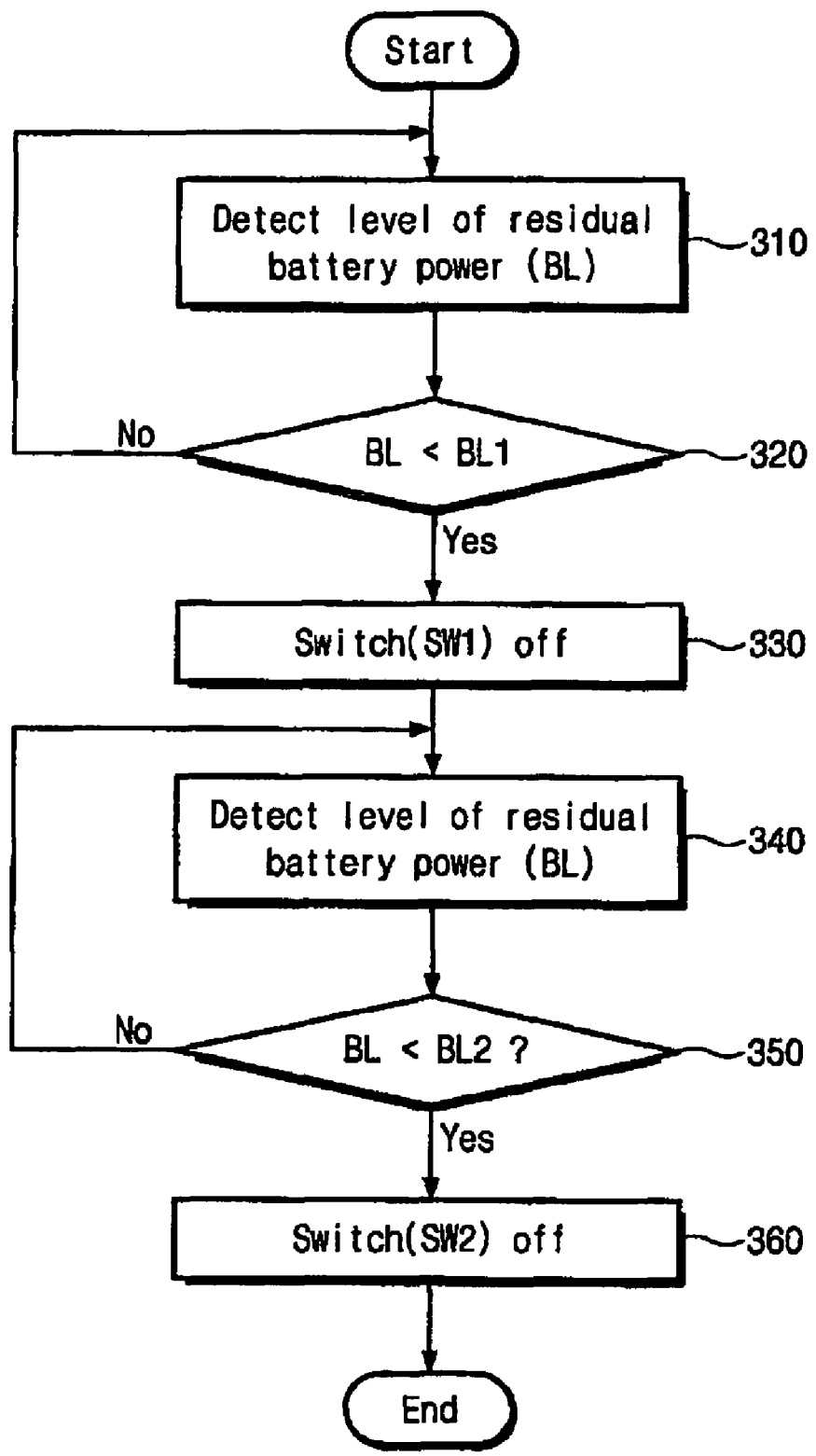
FIG. 3 is a flowchart summarizing a method of controlling the residual battery power detector of FIG. 1.

FIG. 2 is a graph illustrating the ON/OFF switching states of first and second switches SW1 and SW2 of FIG. 1 in relation to the level of detected residual power in battery 140. FIG. 3 is a flowchart summarizing a method of controlling residual battery power detector 151.

When the mobile device 100 is first powered up, residual battery power detector 151 begins operation and activates both of the switching control signals C1 and C2 to turn ON the switches SW1 and SW2. Then, residual battery power detector 151 detects a level of residual battery power (BL) in battery 140 (310). Thereafter, if it is determined that BL is less than a defined first level threshold (BL1), (320=yes), residual battery power detector 151 deactivates the first switching control signal C1 to turn OFF the first switch SW1 (330). Otherwise (320=no), the first BL detection loop continues.

After the first switch SW1 is turned OFF, the residual battery power detector 151 again detects the level of residual battery power (BL) (340), and compares BL to a second level threshold (BL2) (350). If BL is less than BL2 (350=yes), residual battery power detector 151 deactivates the second switching control signal C2 to turn OFF the second switch SW2 (360). Otherwise (350=no), the second BL detection loop continues.

The primary function provided by many mobile devices is voice and data communication. Therefore, to secure the longest available period of voice/data communications, mobile device 100 should limit the provision of power to peripheral circuits in relation to detection outcome of the operation provided by residual battery power detector 151. Thus, the foregoing method provides power to both RF chip 110 and smart card 120 so long as the detected residual battery power is sufficient (i.e., above the first level threshold BL1). However, as the detected residual battery power falls below the first level threshold (BL1) and then the second level threshold (BL2), power is sequentially cut off from RF chip 110 and then smart card 120.

In many embodiments of the invention, RF chip 110 may obtain power by receiving the RF signal provided by the RFID reader through antenna 101, even if the power routinely supplied by battery 140 is cut off. Relevant physical and operating characteristics for contactless smart cards including an RF chip 110 susceptible to incorporation in an embodiment of the invention (i.e., radio frequency (RF) power levels and characteristics, signal interfaces, initialization and anti-collision protocols, etc.) may be defined by such conventional standards as ISO/IEC 14443, for example. Pursuant to this particular protocol, RF chip 110 may receive power from an RF signal received from the RFID reader through antenna 101.

Smart card 120 may be designed to receive power from RF chip 110 when the provision of power from battery 140 is interrupted. Therefore, it is possible to normally use supplementary functions, e.g., subway/bus fare payment, even if the level of residual power in battery 140 is too low to allow mobile device 100 to operate in its primary functionality and even when powered off.

According to embodiments of the invention, power management may be effectively performed when a circuit block implementing wireless communication functionality within a mobile device and circuit block implementing smart card functionality are separately configured. In particular, it is possible to secure minimum primary function time (i.e., voice/data communication) by halting the provision of power to the RF chip and smart card chip when a level of residual battery power falls below set thresholds. Further, it is also possible to normally use NFC functionality (e.g., subway/bus fare payment, etc.) even when the level of residual battery power is too low for operating the mobile device in its primary functionality, or when the mobile device is powered off.

The above-disclosed subject matter is to be considered illustrative, and not restrictive, and the appended claims are intended to cover all such modifications, enhancements, and other embodiments, which fall within the scope of the invention. Thus, to the maximum extent allowed by law, the scope of the present invention is to be determined by the broadest permissible interpretation of the following claims and their equivalents.

What is claimed is:

1. A mobile electronic device, comprising:
a battery;
a radio frequency communication chip (RF chip) configured within the mobile electronic device as a first integrated circuit (IC) to wirelessly communicate an RF signal with a terminal, wherein the first IC comprises an analog interface connected to an antenna to facilitate the wireless communication of the RF signal;

a smart card configured within the mobile electronic device as a second IC separately powered from the first IC to communicate data signals with the terminal, wherein the smart card is connected to the RF chip, such that the data are communicated via the analog interface and the antenna to the terminal;

a controller configured to control a selective and separate supply of power from the battery to the RF chip and the smart card in accordance with a detected level of residual battery power; and a switching circuit disposed between the battery and each one of the RF chip and smart card, and including a first switch that cuts off supply of power to the RF chip responsive to comparison of the detected level to a first level threshold, and a second switch that cuts off supply of power to the smart card responsive to comparison of the detected level to a second level threshold that is different than the first level threshold, wherein the controller includes a residual battery power detector configured to detect the level of residual battery power and provide first and second switching signals respectively to the first and second switches to control the selective enabling of the supply of battery power to the RF chip and the smart card.

2. The device of claim 1, wherein the switching circuit further comprises a first diode having an anode connected to the second switch and a cathode connected to the smart card.

3. The device of claim 1, wherein the residual battery power detector activates the first switching signal to turn ON the first switch when the detected level of battery power is above the first level threshold and deactivates the first switching signal to turn OFF the first switch when the detected level of battery power is below the first level threshold.

4. The device of claim 3, wherein the residual battery power detector activates the second switching signal to turn ON the second switch when the detected level of battery power is above the second level threshold and deactivates the second switching signal to turn OFF the second switch when the detected level of battery power is below the second level threshold, wherein the second level threshold is less than the first level threshold.

5. The device of claim 1, wherein the RF chip is further configured to receive external power via the antenna and the analog interface when the first switch is turned OFF.

6. The device of claim 5, wherein the smart card is further configured to receive external power via the antenna and the analog interface through the RF chip when the first and second switches are turned OFF.

7. The device of claim 2, wherein the switching circuit further comprises a second diode having an anode connected to the RF chip and a cathode connected to the smart card.

8. The device of claim 1, wherein the RF chip and the smart card are connected using a single wire protocol (SWP) to facilitate the communication of the data signals by the smart card, and the RF chip communicates with the terminal using contactless near field communication (NFC) techniques.

9. A power management method for a mobile device comprising a battery, a radio frequency communication chip (RF chip) having an analog interface connected to an antenna, and a smart card connected to the RF chip, the method comprising:

using the RF chip, wirelessly communicating an RF signal with a terminal through the analog interface;

using the smart card, communicating data signals with the terminal through the analog interface;

using a residual battery power detector disposed within a controller external to the RF chip and smart card, detecting a level of residual battery power provided by the battery; and using a switching circuit disposed between the battery and each one of the RF chip and smart card, selectively disabling the supply of battery power to the smart card and the RF chip in accordance with the detected level of residual battery power, wherein the RF chip is configured within the mobile device as a first integrated circuit (IC) and the smart card is configured within the mobile device as a second IC separate from the first IC, and wherein the selectively disabling comprises cutting off the supply of battery power to the RF chip by shutting off a first switch in the switching circuit when the detected level is lower than a first level threshold, and cutting off the supply of battery power to the smart card by shutting off a second switch in the switching circuit when the detected level is lower than a second level threshold that is less than the first level threshold.

10. The method of claim 9, further comprising:
supplying external power to the RF chip through the antenna and the analog interface after battery power to the RF chip is disabled.

11. The method of claim 9, further comprising:
supplying external power to the smart card through the antenna and the analog interface after battery power to the smart card is disabled.

12. A power management method for a mobile device comprising a battery, a radio frequency communication chip (RF chip) having an analog interface connected to an antenna, and a smart card connected to the RF chip, the method comprising:

communicating an RF signal with a terminal through the analog interface and using the smart card, communicating data signals with the terminal through the analog interface, wherein the RF chip is configured within the mobile device as a first integrated circuit (IC) and the smart card is configured within the mobile device as a second IC separate from the first IC;

using a residual battery power detector external to the RF chip and smart card, detecting a level of residual battery power provided by the battery;

separately and coincidentally supplying battery power to the RF chip and the smart card through a switching circuit disposed between the battery and each one of the RF chip and smart card when the detected residual battery power is above a first level threshold;

cutting off the supply of battery power to the RF chip by shutting off a first switch in the switching circuit when the detected level of residual battery power falls below the first level threshold; and cutting off the supply of battery power to the smart card by shutting off a second switch in the switching circuit when the detected level of residual battery power falls below a second level threshold lower than the first level threshold.

13. The method of claim 12, further comprising:
supplying external power to the RF chip through the antenna and analog interface after cutting off the supply of battery power to the RF chip.

14. The method of claim 12, further comprising:
supplying external power to the smart card through the antenna and analog interface after cutting off the supply of battery power to the smart card.

* * * * *